No. 608,525. Patented Aug. 2, 1898.
H. MÜLLER.
VALVE FOR STEAM ENGINES.
(Application filed Jan. 6, 1898.)

(No Model.)

WITNESSES:
William J. Miller
Chas. E. Poensgen.

INVENTOR
Hugo Müller.
BY
Hauff + Hauff
ATTORNEYS

UNITED STATES PATENT OFFICE.

HUGO MÜLLER, OF AACHEN, GERMANY.

VALVE FOR STEAM-ENGINES.

SPECIFICATION forming part of Letters Patent No. 608,525, dated August 2, 1898.

Application filed January 6, 1898. Serial No. 665,820. (No model.)

*To all whom it may concern:*

Be it known that I, HUGO MÜLLER, a subject of the King of Prussia, Emperor of Germany, residing at Aachen, in the Kingdom of Prussia and German Empire, have invented new and useful Improvements in Valves for Steam-Engines and other Motors, of which the following is a specification.

This invention relates to a valve with rolling movement, or, as it may be called, a "rolling" valve for steam-engines and other motors; and the invention resides in the novel features of construction set forth in the following specification and claims, and illustrated in the annexed drawings, in which—

Figure 1:
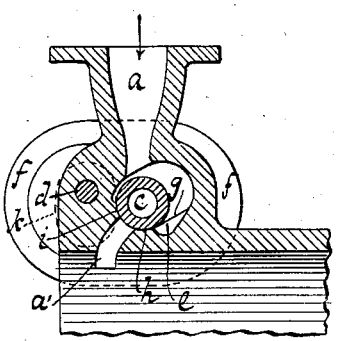
Figure 2:
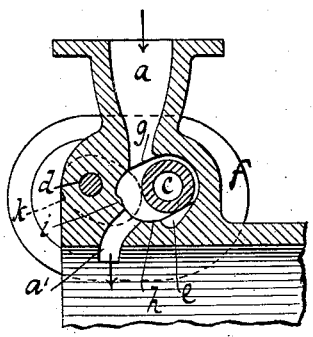

Figure 1 shows the valve or roller in closing position. Fig. 2 shows the valve in opening position.

A chamber-wall $f$, preferably made in sections to be taken apart or provided with a detachable cover or lid, has an inlet-channel $a$ and an outlet-channel $a'$, leading to and from the chamber. In the chamber is a loose cylindrical metal valve $c$, which can move up and down, rolling upon a level or slightly-concaved way or guide $g$. When the roller or valve $c$ is at rest, it closes or covers the channel $a'$. This channel is deflected toward its mouth or communication with chamber $f$ and is provided with seats $h$ and $i$, fitted to receive the valve $c$, so as to make a steam-tight closure when the cylinder is on the channel $a'$. As seen in Fig. 1, the passage of steam is thus completely shut off.

The chamber $f$ at a suitable part bears a shaft $d$, to which are keyed eccentrics or non-circular disks $k$. These eccentrics or actuators $k$, engaging the valve $c$, move the same from the seat $h\ i$, so as to open a communication between the channel parts $a$ and $a'$. Circulation can thus take place, as seen in Fig. 2. Upon the eccentric-shaft $d$ making the proper turn the cylinder $c$ by its gravity will roll back to its position of rest.

The valve $c$ during its movement need not be supported throughout its entire length. It suffices if the valve is supported only at the extensions projecting beyond the channel part $a'$. The depression $e$ can remain unfinished and can serve for the reception of dirt or impurities carried along by the steam.

The shaft $d$ has an end projecting outside the valve-chest $f$ or outside one of its covers or sections and tightened by a stuffing-box or in any known suitable manner. This shaft $d$ can be oscillated by a suitable valve-gear of a motor, which gear is either in constant or in intermittent connection with the shaft. This arrangement, above described, can also replace the exhaust valves or slides in all those power-machines which are provided with a reciprocating piston and in which no vacuum is generated in front of the piston.

What I claim as new, and desire to secure by Letters Patent, is—

1. A chamber having an inlet and an outlet channel, a valve or cylinder for closing one of said channels, and an actuator or eccentric for moving the valve clear of the last-named channel, said chamber having its walls provided with a guide or way for the valve in its movement from and to the last-named channel substantially as described.

2. A chamber having an inlet and an outlet channel, a valve or cylinder for closing one of said channels, and an actuator or eccentric for moving the valve clear of the last-named channel, said channel having concave seats at its mouth fitted to receive the valve for closing said channel substantially as described.

In testimony whereof I have hereunto set my hand in the presence of two subscribing witnesses.

HUGO MÜLLER.

Witnesses:
WILLIAM C. EMMET,
JEAN HECKMANNS.